United States Patent
Ke

(10) Patent No.: US 10,255,192 B2
(45) Date of Patent: Apr. 9, 2019

(54) DATA STORAGE DEVICE AND DATA MAINTENANCE METHOD THEREOF

(71) Applicant: Silicon Motion, Inc., Jhubei, Hsinchu County (TW)

(72) Inventor: Kuan-Yu Ke, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 50 days.

(21) Appl. No.: 15/331,154

(22) Filed: Oct. 21, 2016

(65) Prior Publication Data
US 2017/0139839 A1    May 18, 2017

(30) Foreign Application Priority Data

Nov. 18, 2015    (TW) .............................. 104138018 A

(51) Int. Cl.
*G06F 12/00* (2006.01)
*G06F 12/1009* (2016.01)
(Continued)

(52) U.S. Cl.
CPC ........ *G06F 12/1009* (2013.01); *G06F 3/0619* (2013.01); *G06F 3/0659* (2013.01);
(Continued)

(58) Field of Classification Search
CPC .. G06F 12/1009; G06F 3/0619; G06F 3/0659; G06F 12/0246; G06F 2212/1032; G06F 2212/7201; G06F 2212/2022
See application file for complete search history.

(56) References Cited

U.S. PATENT DOCUMENTS 5,469,453 A * 11/1995 Glider .................. G06F 3/0601
  714/6.12
5,951,691 A *  9/1999 Ng ...................... G06F 11/1076
  714/5.11
(Continued)

FOREIGN PATENT DOCUMENTS

TW    201227740    7/2012
TW    201413453    4/2014
(Continued)

OTHER PUBLICATIONS

Swanson, "Flash Memory Overview", 2011, Univ. Cal. San Diego, all; retrieved from: https://cseweb.ucsd.edu/classes/fa11/cse240A-a/Slides1/18-FlashOverview.pdf (Year: 2011).*

(Continued)

*Primary Examiner* — Arvind Talukdar
(74) *Attorney, Agent, or Firm* — McClure, Qualey & Rodack, LLP

(57) ABSTRACT

The present invention provides a data storage device including a flash memory and a controller. The flash memory includes a plurality of blocks, wherein each of the blocks has a plurality of pages. The controller receives a plurality of write commands in a sequence, assigns a plurality of write sequence numbers to the write commands according to the sequence in which the write commands are received, and writes a plurality of data sectors and the write sequence numbers of the write commands into the pages of a first current block and a second current block of the blocks according to the write commands.

4 Claims, 10 Drawing Sheets

(51) Int. Cl.
*G06F 3/06* (2006.01)
*G06F 12/02* (2006.01)

(52) U.S. Cl.
CPC ........ *G06F 3/0679* (2013.01); *G06F 12/0246* (2013.01); *G06F 2212/1016* (2013.01); *G06F 2212/1032* (2013.01); *G06F 2212/2022* (2013.01); *G06F 2212/7201* (2013.01)

(56) References Cited

U.S. PATENT DOCUMENTS

| | | | |
|---|---|---|---|
| 8,688,894 B2 | 4/2014 | Kuehne | |
| 8,738,876 B2 | 5/2014 | Shen | |
| 2011/0099323 A1* | 4/2011 | Syu | G06F 12/0246 711/103 |
| 2014/0082265 A1 | 3/2014 | Cheng | |
| 2014/0258587 A1* | 9/2014 | Baryudin | G06F 12/0246 711/102 |
| 2014/0310483 A1* | 10/2014 | Bennett | G06F 12/00 711/154 |
| 2014/0369124 A1 | 12/2014 | Moon et al. | |
| 2015/0186264 A1 | 7/2015 | Lin et al. | |

FOREIGN PATENT DOCUMENTS

| | | |
|---|---|---|
| TW | 201510723 | 3/2015 |
| TW | 201511013 | 3/2015 |
| TW | 201527971 | 7/2015 |
| TW | 201532053 | 8/2015 |

OTHER PUBLICATIONS

Wu et al., "A File-System-Aware FTL Design for Flash Memory Storage Systems", 2009, National Taiwan University; retrieved from: https://pdfs.semanticscholar.org/dcb5/67ea41cd184f98c9b1c1e66bb4dd9768d0ce.pdf (Year: 2009).*

Larrivee, "Solid State Drive Primer #10—Controller Functions—Wear Leveling", 2015, Cactus Technologies; retrieved from: https://www.cactus-tech.com/resources/blog/details/solid-state-drive-primer-10-controller-functions-wear-leveling (Year: 2015).*

Park et al., "A Reconfigurable FTL Architecture for NAND Flash-Based Applications",2008, ACM, retrieved from: http://citeseerx.ist.psu.edu/viewdoc/download?doi=10.1.1.455.3731&rep=repl&type=pdf (Year: 2008).*

Lim, "Implementation of metadata logging and power loss recovery for page-mapping FTL", 2013, IEICE, retrieved from: https://pdfs.semanticscholar.org/a20a/32204fdebcc308d7ce7d8e3fd52c0a20cc83.pdf (Year: 2013).*

Chung et al. "System Software for Flash Memory: A Survey", 2006, ACM; retrieved from: https://pdfs.semanticscholar.org/bd26/3ebc3e8cec76ea3f3ffa83a7878af4dfdd63.pdf (Year: 2006).*

Pratibha et al. "Efficient Flash Translation Layer for Flash Memory", 2013, International Journal of Scientific and Research Publications, retrieved from: https://pdfs.semanticscholar.org/ccac/640e379bea5586bfe753cb08cd4a6f84fd80.pdf (Year: 2013).*

Sykes, "Critical Role or Firmware and Flash Translation Layers in Solid state Drive Design", 2012, Flash Memory Summit, retrieved from: https://www.flashmemorysummit.com/English/Collaterals/Proceedings/2012/20120821_TB11_Sykes.pdf (Year: 2012).*

Park et al, "Design of a NAND Flash Memory File System to Improve System Boot Time", 2006, International Journal of Information Processing Systems, retrieved at: http://www.ann.ece.ufl.edu/courses/eel6935_11fal/papers/nand%20file%20systems.pdf (Year: 2006).*

Wei et al. "BPM: A Bad PAge MAnagement Strategy for the Lifetime Extension of Flash Memory," 2015, IDETC, retrieved from: https://www.researchgate.net/publication/291756470/download (Year: 2015).*

* cited by examiner

| | SPA0 | SPA1 | SPA2 | SPA3 | SPA4 | SPA5 | SPA6 | SPA7 | SPA8 | SPA9 | SPA10 | SPA11 | SPA12 | SPA13 | SPA14 | SPA15 |
|---|---|---|---|---|---|---|---|---|---|---|---|---|---|---|---|---|
| | AD2,2 | AD3,2 | AD4,2 | AD5,2 | AD7,3 | AD8,3 | AD9,3 | | | | | | | | | |
| | D2 | D2 | D2 | D2 | D3 | D3 | D3 | | | | | | | | | |
| | P0 | P1 | P2 | P3 | P4 | P5 | P6 | P7 | P8 | P9 | P10 | P11 | P12 | P13 | P14 | P15 |

CB1

| | SPA0 | SPA1 | SPA2 | SPA3 | SPA4 | SPA5 | SPA6 | SPA7 | SPA8 | SPA9 | SPA10 | SPA11 | SPA12 | SPA13 | SPA14 | SPA15 |
|---|---|---|---|---|---|---|---|---|---|---|---|---|---|---|---|---|
| | AD1,1 | AD6,3 | AD10,3 | AD2,4 | | | | | | | | | | | | |
| | D1 | D3 | D3 | D4 | | | | | | | | | | | | |
| | P0 | P1 | P2 | P3 | P4 | P5 | P6 | P7 | P8 | P9 | P10 | P11 | P12 | P13 | P14 | P15 |

# DATA STORAGE DEVICE AND DATA MAINTENANCE METHOD THEREOF

CROSS REFERENCE TO RELATED APPLICATIONS

This Application claims priority of Taiwan Patent Application No. 104138018, filed on Nov. 18, 2015, the entirety of which is incorporated by reference herein.

BACKGROUND OF THE INVENTION

Field of the Invention

The present invention is related to a data storage device, and in particular it is related to a data storage device capable of maintaining data by using sequence numbers.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data, wherein the flash memory uses floating gate transistors. The floating gates of the floating gate transistor may catch electronic charges for storing data. Moreover, the mapping relationships of the physical pages of the flash memory and the logical page assigned by the controller are recorded by a mapping table. When power unexpectedly turns off, the mapping table stored in the random access memory will be lost. Therefore, it is important to efficiently rebuild the mapping table while the flash memory is being resumed.

BRIEF SUMMARY OF THE INVENTION

A detailed description is given in the following embodiments with reference to the accompanying drawings.

An exemplary embodiment provides a data storage device including a flash memory and a controller. The flash memory includes a plurality of blocks, each of the blocks has a plurality of pages. The controller receives a plurality of write commands in a sequence, assigns a plurality of write sequence numbers to the write commands according to the sequence in which the write commands are received, and writes a plurality of data sectors and the write sequence numbers of the write commands into the pages of a first current block and a second current block of the blocks according to the write commands.

Another exemplary embodiment provides a data storage device including a flash memory and a controller. The flash memory includes a plurality of blocks, each of the blocks includes a plurality of pages, and each of the pages has a spare area. The controller sequentially reads a plurality of logical addresses and a plurality of write sequence numbers stored in the pages of a first current block and a second current block of the blocks to build a physical-logical mapping table when the data storage device is resumed from a power-off state, wherein when the controller detects that a specific page is damaged during the process of reading the first current block and the second current block, the controller invalidates the specific page, and reads the write sequence number and the logical address of the specific page to invalidate the page with the write sequence number greater than the write sequence number of the specific page and invalidate the page with the write sequence number, which is equal to the write sequence number of the specific page, and the logical address, which is greater than the logical address of the specific page.

Another exemplary embodiment provides a data storage device including a flash memory and a controller. The flash memory includes a plurality of blocks, each of the blocks includes a plurality of pages, each of the pages has a spare area. The controller sequentially reads a plurality of logical addresses and a plurality of write sequence numbers stored in the pages of a first current block and a second current block of the blocks to build a physical-logical mapping table when the data storage device is resumed from a power-off state, wherein when the controller detects that any of the logical addresses is in both the first current block and the second current block during the process of reading the first current block and the second current block, the controller compares the write sequence numbers of the pages with the same logical address, and invalidates the page with the smaller write sequence number.

Another exemplary embodiment provides a data maintenance method applied to a data storage device with a flash memory. The flash memory includes a plurality of blocks, each of the blocks includes a plurality of pages. The data maintenance method including: receiving a plurality of write commands in a sequence; assigning a plurality of write sequence numbers to the write commands according to the sequence in which the write commands are received; and writing a plurality of data sectors and the write sequence numbers of the write commands into the pages of a first current block and a second current block of the blocks according to the write commands.

Another exemplary embodiment provides a data maintenance method applied to a data storage device with a flash memory, the flash memory includes a plurality of blocks, each of the blocks includes a plurality of pages. The data maintenance method including: when the data storage device is resumed from a power-off state, reading a plurality of logical addresses and a plurality of write sequence numbers stored in the pages of a first current block and a second current of the blocks to build a physical-logical mapping table; detecting whether the pages are damaged during the step of reading the first current block and the second current block; when a specific damaged page is detected in the first current block or the second current block, invalidating the specific page and comparing the write sequence number of the specific page with the write sequence numbers of the other pages of the first current block and the second current block; invalidating the page with the write sequence number that is greater than the write sequence number of the specific page; when the write sequence number of the specific page is equal to at least one third page of the first current block and the second current block, comparing the logical address of the specific page with the logical address of the third page; and invalidating the third page with the logical address that is greater than the logical address of the specific page.

Another exemplary embodiment further provides a data maintenance method applied to a data storage device with a flash memory, the flash memory includes a plurality of blocks, and each of the blocks includes a plurality of pages. The data maintenance method including: when the data storage device is resumed from a power-off state, reading a plurality of logical addresses and a plurality of write sequence numbers stored in the pages of a first current block and a second current block to build a physical-logical mapping table; detecting whether any of the logical addresses is in both the first current block and the second current block during the process of reading the first current block and the second current block; when at least one of the logical addresses which is in both the first current block and the second current block is detected during the process of reading the first current block and the second current block, comparing the write sequence numbers of the pages storing the same logical address; and invalidating the page with the smaller write sequence number.

BRIEF DESCRIPTION OF THE DRAWINGS

The present invention can be more fully understood by reading the subsequent detailed description and examples with references made to the accompanying drawings, wherein:

FIG. 3 is a schematic diagram illustrating a current block, in accordance with an embodiment.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
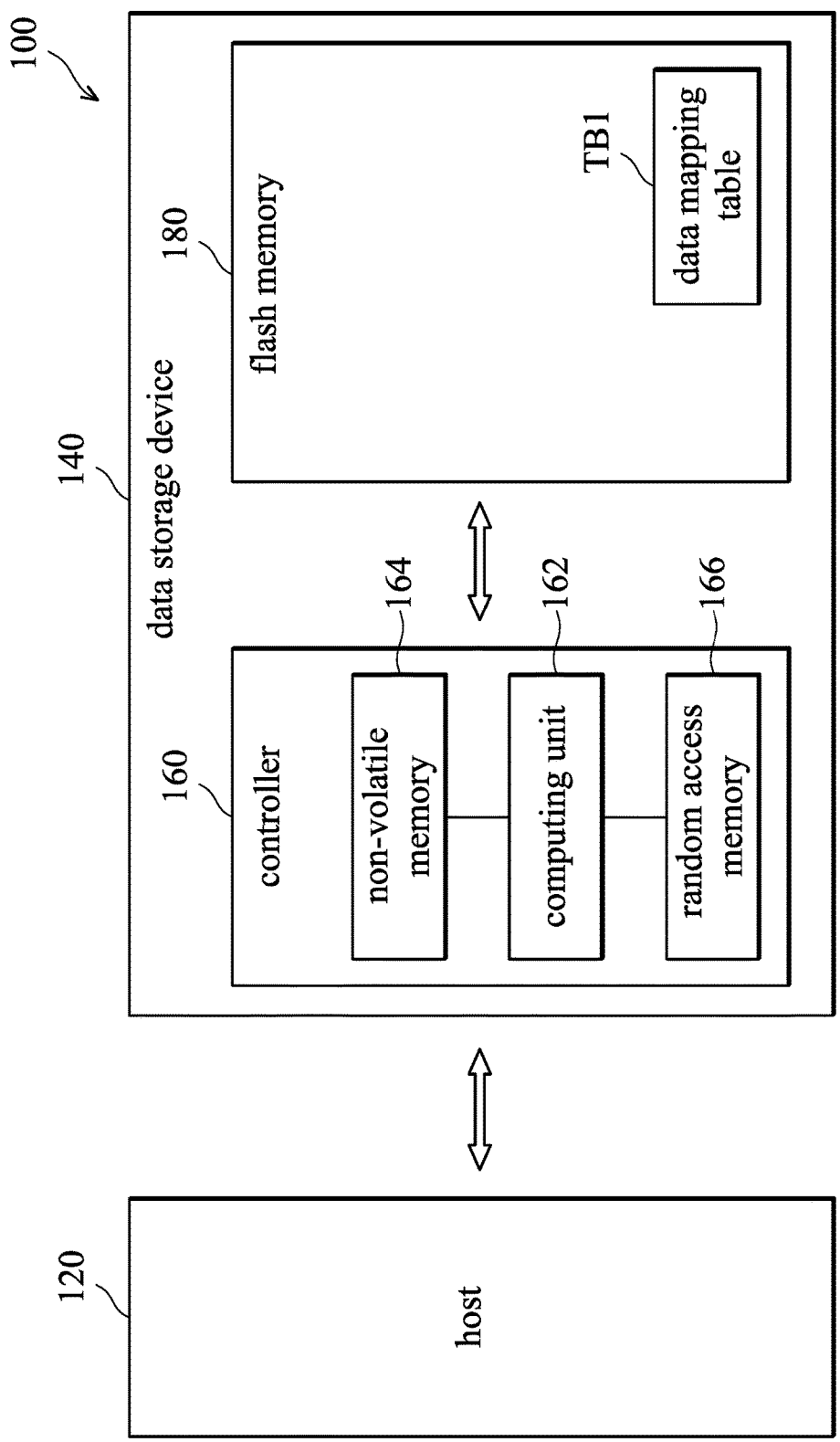
FIG. 1 is a schematic diagram illustrating an electronic system, in accordance with an embodiment.
Figure 2:
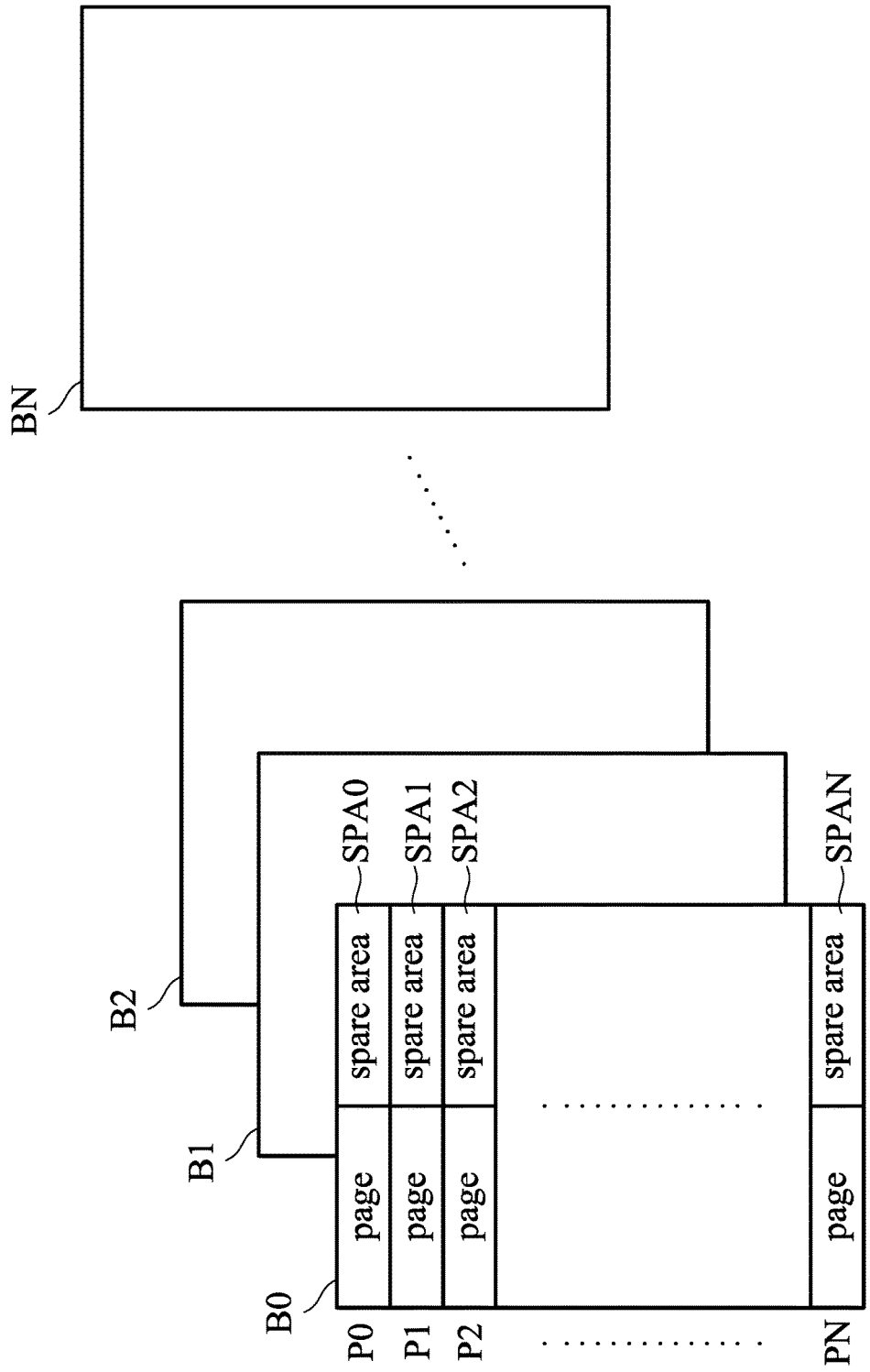
FIG. 2 is a schematic diagram illustrating a flash memory, in accordance with an embodiment.

FIG. 1 is a schematic diagram illustrating an electronic system, in accordance with an embodiment. The electronic system 100 includes a host 120 and a data storage device 140. The data storage device 140 includes a flash memory 180 and a controller 160, and operates in response to the commands of the host 120. The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the computing unit 162, and the controller 160 is configured to control the flash memory 180 based on the firmware. The program code sand parameters are arranged to be loaded on the random access memory (RAM) 166 to provide the controller 160. The flash memory 180 includes a plurality of blocks, each of the blocks includes a plurality of pages P0~PN, wherein each of the pages P0~PN has a spare area SPA0~SPAN, as shown in FIG. 2. It should be noted that the minimum erase unit of the flash memory 180 is a block, and the minimum write unit of the flash memory 180 is a page. Moreover, the spare areas SPA0~SPAN can be arranged at the front or end (beginning or end) of the pages, but it is not limited thereto. In other embodiments, the spare areas SPA0~SPAN also can be arranged at the front or end of the blocks B0~BN. It should be noted that, in one of the embodiments, each of the spare areas of the pages with valid data includes a logical address and a write sequence number. The flash memory 180 further includes a data mapping table TB1 arranged to record the mapping relationships of the logical addresses and physical addresses of all of the pages and the mapping relationships of the logical addresses and physical addresses of all of the blocks in the flash memory 180.

In one of the embodiments, the controller 160 receives write commands in sequence, and assigns the write sequence numbers to the write commands according to the order in which the write commands are received. Moreover, the controller 160 further writes the write sequence number of the write command currently being performed and data into the page(s) of a first current block CB0 or a second current block CB1 of the blocks in response to the write commands. In one embodiments, the controller 160 determines the data that is indicated to be written by the write commands is sequential type or random type according to the write command, wherein the controller 160 further writes the data which belongs to the sequential type into the pages of the first current block CB0 and writes the data which belongs to the random type into the pages of the second current block CB1. For example, when the quantity of data that is indicated to be written by the write command is greater than the quantity of the memory space of a page, the controller 160 determines that the data that is indicated to be written by the write commands belongs to the sequential type. When the quantity of data that is indicated to be written by the write command is less than the amount of the memory space of a page, the controller 160 determines that the data that is indicated to be written by the write commands belongs to the random type, but it is not limited thereto. It should be noted that, when the data belongs to the sequential type and a part of the data cannot fill a page, the controller 160 determines that the part of the data belongs to the random type. In another embodiment, the controller 160 further writes the logical address corresponding to the data into the page of the first current block CB0 and the page of the second current block CB1. More specifically, in the process of data writing, the controller 160 selects two available blocks from the blocks B0~BN of the flash memory 180, serves the selected two blocks as a first current block CB0 and a second current block CB1, and builds a physical-logical mapping table in the random access memory 166 to record the mapping relationships of the physical addresses and the logical address of the pages in the first current block CB0 and the second current block CB1, as shown in FIG. 3. The first current block CB0 is arranged to store the data which belongs to the sequential type, and the second current block CB1 is arranged to store the random data. When the first current block CB0 and the second current block CB1 are filled, the controller 160 integrates the physical-logical mapping table into the data mapping table TB1, defines the first current block CB0 and the second current block CB1 as mother blocks (data blocks), selects two available blocks from the blocks B0~BN of the flash memory 180 again, serves a new selected two blocks as the new first current block CB0 and a new second current block CB1, and builds a new physical-logical mapping table in the random access memory 166 to record the mapping relationships of the physical addresses and the logical address of the pages in the new first current block CB0 and the new second current block CB1.

FIG. 3 is a schematic diagram illustrating a current block, in accordance with an embodiment. In one of the embodiments, each of the blocks B0~BN of the flash memory 180 includes 16 number of pages P0~P15, each of the pages P0~P15 has a spare area (SPA0~SPA15), but it is not limited thereto. Therefore, each of the first current block CB0 and the second current block CB1 selected by the controller 160 includes 16 number of pages P0~P15 and 16 number of spare areas SPA0~SPA15.

For example, when the controller 160 receives a first write command arranged to write first data sector D1, the controller 160 assigns a first write sequence number to the first write command according to the sequence in which the write commands are received. For example, when no write commands are received before the first write command after the controller 160 selects the first current block CB0 and second current block CB1, the controller 160 assigns "1" to the first write command as the write sequence number of the first write command. It should be noted that, the first write command includes the logical address AD1 of the first data sector D1. The amount of the first data sector D1 indicated to be written by the first write command is equal to the quantity of a page, and the controller 160 determines that the first data sector D1 belongs to a random type. Next, the controller 160 writes the first data sector D1, the first write sequence number "1" and the logical address AD1 into page P0 of the second current block CB1. Lastly, the controller 160 records the mapping relationship of the physical address of page P0 of the second current block CB1 and the logical address AD1 in the physical-logical mapping table.

Next, the controller 160 receives a second write command arranged to write a plurality of second data sectors D2. The controller 160 assigns a second write sequence number to the second write command according to the sequence in which the second write command is received. The second write command is received after the first write command, and so the controller 160 assigns "2" as the write sequence number of the second write command. It should be noted that the second write command includes the logical addresses AD2~AD5 of the second data sectors D2. The total quantity of second data sectors D2 indicated to be written by the second write command is greater than the quantity of a page, so the controller 160 determines that the second data sectors D2 belong to the sequential type. Next, the controller 160 writes the second data sectors D2, the second write sequence number "2" and the logical addresses AD2~AD5 into the pages P0~P3 of the first current block CB0, respectively. More specifically, the controller 160 writes the first of the second data sectors D2, the second write sequence number "2" and the logical address AD2 into page P0 of the first current block CB0; writes the second of the second data sectors D2, the second write sequence number "2" and the logical address AD3 into page P1 of the first current block CB0; writes the third of the second data sectors D2, the second write sequence number "2" and the logical address AD4 into page P2 of the first current block CB0, and so on. Lastly, the controller 160 records the mapping relationships of the logical addresses AD2~AD5 and the physical addresses of the pages P0~P3 of the first current block CB0 in the physical-logical mapping table.

Next, the controller 160 receives a third write command arranged to write a plurality of third data sectors D3. The controller 160 assigns a third write sequence number to the third write command according to the sequence in which the third write command is received. The third write command is received after the second write command, so the controller 160 assigns "3" to the third write command to serve as the write sequence number of the third write command. It should be noted that, the third write command includes the logical addresses AD6~AD10 of the third data sectors D3. The quantity of third data sectors D3 indicated to be written by the third write command is greater than the amount of a page. However, the first and the last of the third data sectors D3 are less than a page, so the first and the last of the third data sectors D3 belong to the random type, and the other third data sectors D3 belong to the sequential type. For example, the quantity of each of the pages P0~P15 is 16K, wherein the address of the first page is 0~15K, the address of the second page is 16~32K, and so on. When the logical address AD6 of the start address of the third data sector D3 is 8K, the first of the third data sectors D3 is arranged to be stored in the address of 8~15K, the first of the third data sectors D3 is less than the quantity of a page, and the first one corresponding to the logical address AD6 of the third data sectors D3 is random type. Next, the controller 160 respectively writes the first and the last of the third data sectors D3 belonging to the random type, the third write sequence number "3" and the logical addresses AD6 and AD10 into page P1 and page P2 of the second current block CB1, and respectively writes the other parts of the third data sectors D3 that belong to the sequential type, the third write sequence number "3" and the logical addresses AD7~AD9 into the pages P4~P6 of the first current block CB0. More specifically, the controller 160 writes the first of the third data sectors D3, the third write sequence number "3" and the logical address AD6 into page P1 of the second current block CB1; writes the second of the third data sectors D3, the third write sequence number "3" and the logical address AD7 into page P4 of the first current block CB0; writes the third of the third data sectors D3, the third write sequence number "3" and the logical address AD8 into page P5 of the first current block CB0, and so on. Lastly, the controller 160 records the mapping relationships of the logical addresses AD6~AD9 and the physical addresses of the pages of the first current block CB0 and the second current block CB1 in the physical-logical mapping table.

When the controller 160 receives a fourth write command arranged to write fourth data sector D4, the controller 160 assigns a fourth write sequence number to the fourth write command according to the sequence in which the fourth write command is received. The fourth write command is received subsequent to the third write command, so the controller 160 assigns "4" as the write sequence number of the fourth write command. It should be noted that the fourth write command includes the logical address AD2 of the fourth data. The quantity of fourth data of the fourth write command is less than the quantity of a page, and the controller 160 determines that the fourth data sector D4 belongs to the random type. Next, the controller 160 writes the fourth data sector D4, the fourth write sequence number "4" and the logical address AD2 into page P3 of the second current block CB1. Lastly, the logical address AD2 of the fourth data sector D4 is same as the logical address AD2 of the second data sector D2 stored in page P0 of the first current block CB0. Therefore, after writing the fourth data sector D4, the controller 160 updates the physical address corresponding to the logical address AD2 by page P3 of the second current block CB1 in the physical-logical mapping table. As described above, each of the pages with the valid data includes data, a write sequence number, and a logical address of the data. Moreover, in the present invention, the controller 160 can use the write sequence numbers of the write sequence in the data maintenance of the flash memory 180.

When data storage device 140 is power off, the random access memory 166 loses the physical-logical mapping table. Therefore, the controller 160 have to retrieve the data from the pages of the first current block CB0 and the second current block CB1 in sequence to rebuild the physical-logical mapping table in the random access memory 166 when the data storage device 140 is resumed from a power-off state. Furthermore, the controller 160 can identify the order in which the data sectors with the same logical address are written by the write sequence numbers, record the data sector that was the last written into the first current block CB0 or the second current block CB1 in the physical-logical mapping table, and invalidate the older data sectors. Namely, the controller 160 will not record the older data sectors in the physical-logical mapping table. Moreover, when the pages of the first current block CB0 and the second current block CB1 are damaged due to the unexpected power-off state, the controller 160 are capable of identifying the damaged pages stored in the different current blocks and invalidating the page written after the damaged page.

More specifically, in one of the embodiments, when the controller 160 detects that a specific page of the first current block CB0 or the second current block CB1 is damaged during the process of reading the first current block CB0 and the second current block CB1, the controller 160 invalidates the damaged specific page, and reads the write sequence number and the logical address of the damaged specific page to invalidate the page with the write sequence number that is greater than the write sequence number of the specific page and the page having the write sequence number equal to the write sequence number of the specific page and the logical address greater than the logical address of the specific page. Moreover, when the write sequence number and the logical address of the specific page cannot be successfully read, the controller 160 invalidates the damaged specific page, reads the write sequence number and the logical address of a reference specific page that precedes the specific page, and invalidates the page with the write sequence number that is greater than the write sequence number of the reference specific page and the page having the write sequence number equal to the write sequence number of the reference specific page and having the logical address greater than the logical address of the reference specific page.

Based on FIG. 3, when the data sector D3 of page P5 in the first current block CB0 is damaged due to the power-off state, the controller 160 invalidates the data sector D3 stored in page P5 and the data sector(s) that is written after the data sector D3 of page P5 in the first current block CB0 and the second current block CB1. More specifically, when the controller 160 detects that page P5 of the first current block CB0 is damaged during the process of reading the first current block CB0 and the second current block CB1, the controller 160 invalidates the damaged page P5 and reads the write sequence number of page P5 of the first current block CB0. Next, the controller 160 compares the write sequence number "3" stored in page P5 of the first current block CB0 with the write sequence numbers stored in the other pages of the first current block CB0 and the second current block CB1. The write sequence number of page P4 of the second current block CB1 is "4", so the controller 160 invalidates page P4 of the second current block CB1 with the write sequence number larger than the write sequence number "3" of page P5. Next, the controller 160 detects that the write sequence numbers stored in page P4 and page P6 of the first current block CB0 and the pages P1~P2 of the second current block CB1 are equal to the write sequence number stored in page P5 of the first current block CB0. The controller 160 reads the logical address "AD8" of page P5 of the first current block CB0, and compares the logical address "AD8" of page P5 of the first current block CB0 with the logical addresses of the pages P1~P2 of the second current block CB1 and page P4 and page P6 of the first current block page CB0. The logical address of page P4 of the first current block CB0 is AD7, the write sequence number of page P6 of the first current block CB0 is AD9, and the write sequence number of page P2 of the second current block CB1 is AD10, so the controller 160 invalidates page P6 of the first current block CB0 having the logical address that is greater than the logical address "AD8" of page P5 and page P2 of the second current block CB1 having the logical address that is greater than the logical address "AD8" of page P5.

When the write sequence number and the logical address of the damaged page P5 in the first current block CB0 cannot be successfully read, the controller 160 invalidates the damaged page P5 and serves page P4 of the first current block CB0 with the physical address that precedes the physical address of page P5 of the first current block CB0 as a reference specific page. The controller 160 reads the write sequence number of page P4 in the first current block CB0. Next, the controller 160 compares the write sequence number "3" of page P4 of the first current block CB0 with the write sequence numbers of the other pages in the first current block CB0 and the second current block CB1. The write sequence number of page P4 of the second current block CB1 is 4, so the controller 160 invalidates page P4 of the second current block CB1 that has the write sequence number greater than the write sequence number "3" of page P5. Next, the controller 160 detects that the write sequence numbers of page P6 of the first current block CB0 and the pages P1~P2 of the second current block CB1 are equal to the write sequence number of page P4 of the first current block CB0. The controller 160 reads the logical address "AD7" of page P4 of the first current block CB0, and compares the logical address of page P6 of the first current block CB0 with the logical addresses of the pages P1~P2 of the second current block page CB1. The write sequence number of page P6 of the first current block CB0 is AD9, and the write sequence number of page P2 of the second current block CB1 is AD10, so the controller 160 invalidates page P2 of the second current block CB1 that has the logical address greater than the logical address "AD7" of page P4 and invalidates page P6 of the first current block CB0 that has the logical address greater than the logical address "AD7" of page P4. As described above, when the pages of the first current block CB0 and the second current block CB1 are damaged due to the power-off state, the controller 160 can identify the damaged page and invalidate the pages that were written after the damaged pages. In this embodiment, the controller 160 cannot determine whether page P2 of the second current block CB1 was written after the damaged page P5 of the first current block CB0 without the write sequence numbers.

In another embodiment, when the controller 160 detects that the page of the first current block CB0 and the page of the second current block CB1 have the same logical address during the process of reading the first current block CB0 and the second current block CB1, the controller 160 compares the write sequence numbers of the pages with the same logical address, and invalidates the page with the smaller write sequence number.

Based on FIG. 3, the controller 160 detects that page P0 of the first current block CB0 and page P3 of the second current block CB1 have the same logical address "AD2" during the process of reading the first current block CB0 and the second current block CB1. The controller 160 compares the write sequence number of page P0 of the first current block CB0 with the write sequence number of page P3 of the second current block CB1. In this embodiment, the write sequence number of page P0 of the first current block CB0 is "2", and the write sequence number of page P3 of the second current block CB1 is "4". Next, the controller 160 invalidates page P0 of the first current block CB0 which has the smaller write sequence number. As described above, the controller 160 can identify the order in which the data sectors were written into the current blocks by the write sequence numbers to record the last data sector in the physical-logical mapping table and invalidate the older data sectors with the same logical address.

Figure 4:
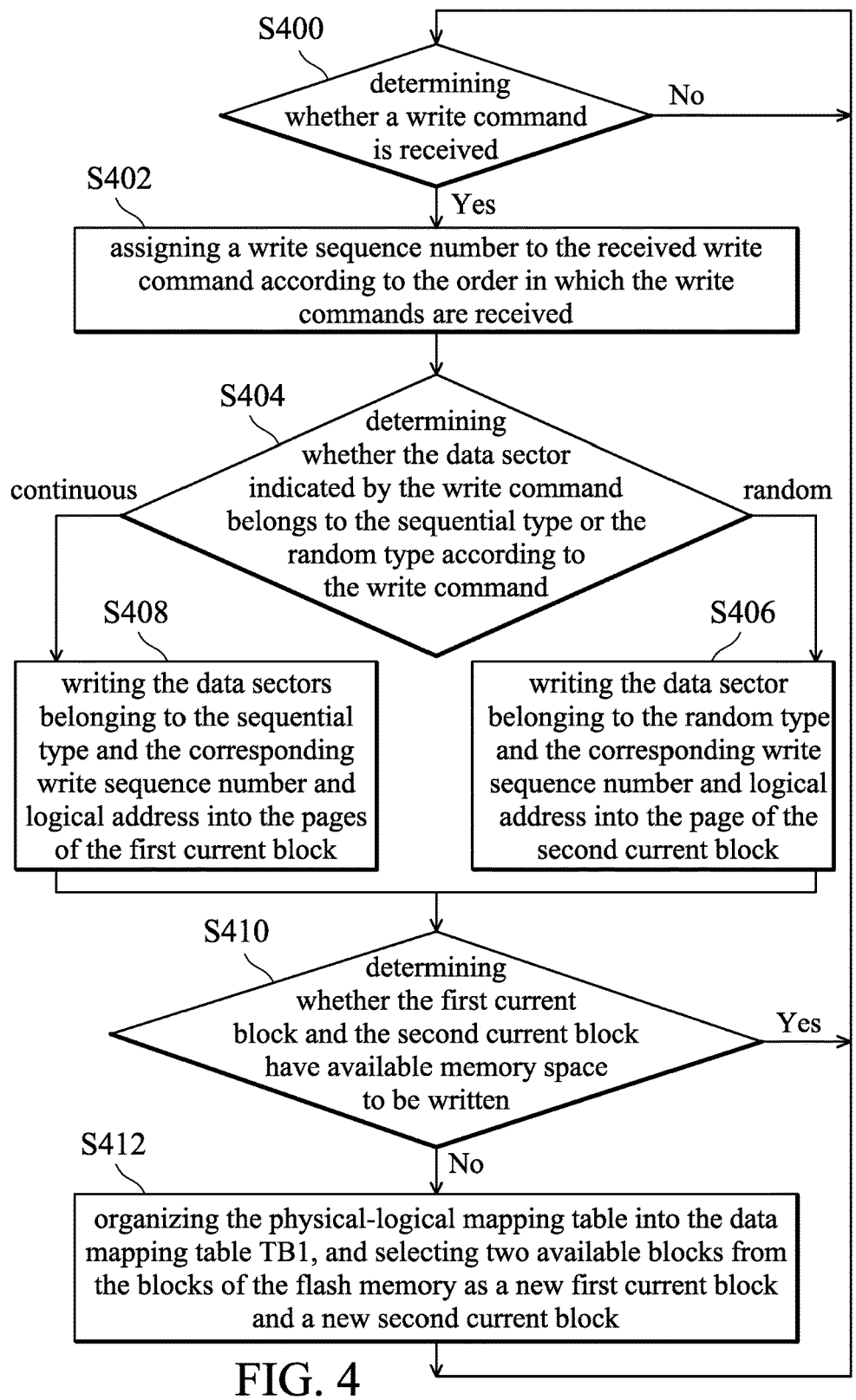
FIG. 4 is a flowchart of a data maintenance method in accordance with certain embodiments.

FIG. 4 is a flowchart of a data maintenance method in accordance with certain embodiments. The data maintenance method is applied to the data storage device 140 of FIG. 1, and the data maintenance method of FIG. 4 is arranged to write data into the flash memory 180. The process starts at step S400.

In step S400, the controller 160 determines whether a write command is received. When the controller 160 receives a write command, the process goes to step S402, otherwise the process returns to step S400 to continue to determine whether a write command is received. It should be noted that the write command includes at least one logical address, and the write command is arranged to indicate the controller 160 to write at least one data sector into the logical addresses.

Next, in step S402, the controller 160 assigns a write sequence number to the received write command according to the order in which the write commands are received. For example, as shown in FIG. 3, when the controller 160 receives a first write command arranged to write a first data sector D1, the controller 160 assigns a first write sequence number to the first write command according to the sequence in which the write commands are received. wherein when no write commands are received before the first write command after the controller 160 selects the first current block CB0 and second current block CB1, the controller 160 assigns "1" to the first write command as the write sequence number of the first write command. When the controller 160 receives a second write command subsequent to the first write command, the controller 160 assigns a second write sequence number to the second write command according to the sequence in which the second write command is received, wherein the second write command is received subsequent to the first write command, so the controller 160 assigns "2" as the write sequence number of the second write command. When the controller 160 receives a third write command subsequent to the second write command, the controller 160 assigns a third write sequence number to the third write command according to the sequence in which the third write command is received, wherein the third write command is received subsequent to the second write command, so the controller 160 assigns "3" as the write sequence number of the third write command. It should be noted that the write sequence numbers are arranged to represent the performing sequence of the write commands. In other embodiments, the write sequence numbers can also be other values or codes that can represent the sequence of the write commands.

Next, in step S404, the controller 160 determines whether the data sector indicated by the write command belongs to the sequential type or the random type according to the write command. When the controller 160 determines that the data sector belongs to the random type, the process goes to step S406. When the controller 160 determines that the data sector belongs to the sequential type, the process goes to step S408. For example, when quantity of data sectors indicated by the write command is greater than the amount of the memory space of a page, the controller 160 determines that the data sector(s) of the write command belongs to the sequential type. When the quantity of data sectors to be written by the write command is less than the amount of the memory space of a page, the controller 160 determines that the data sectors to be written by the write command belong to a random type, but it is not limited thereto. It should be noted that when the data sectors of the write command belongs to the sequential type and some of the data sectors cannot fill a page, the controller 160 determines that the data sector that canoe fill a page belongs to the random type.

In step S406, the controller 160 writes the data sector belonging to the random type and the corresponding write sequence number and logical address into the page of the second current block CB1 according to the received write command, and records the mapping relationship of the physical address and the logical address of the page of the second current block CB1 in the physical-logical mapping table. As shown in FIG. 3, the controller 160 receives a first write command arranged to write a first data sector D1 in step S400. No write commands are received before the first write command after the controller 160 selects the first current block CB0 and second current block CB1, so the controller 160 assigns "1" to be the write sequence number of the first write command in step S402. The quantity of the data sector D1 that is indicated to be written by the first write command is greater than the amount of the memory space of a page, so the controller 160 determines that the first data sector D1 belongs to the random type in step S404. Next, in step S406, the controller 160 writes the data sector D1, the first write sequence number "1" and the logical address AD1 into page P0 of the second current block CB1. Lastly, the controller 160 records the mapping relationship of the physical address of page P0 of the second current block CB1 and the logical address AD1 in the physical-logical mapping table.

In step S408, the controller 160 writes the data sectors belonging to the sequential type and the corresponding write sequence number and logical address into the pages of the first current block CB0 according to the write command, and records the mapping relationship of the physical address of the written page of the first current block CB0 and the logical address in the physical-logical mapping table. As shown in FIG. 3, the controller 160 receives a second write command arranged to write a plurality of second data sectors D2 in step S400. The second write command is received subsequent to the first write command, so the controller 160 assigns "2" as the write sequence number of the second write command in step S402. It should be noted that the second write command includes the logical addresses AD2~AD5 of the second data sectors D2. The total quantity of second data sectors D2 of the second write command is greater than a page. Therefore, the controller 160 determines that the data sectors D2 belongs to the sequential type in step S404. Next, in step S408, the controller 160 respectively writes the second data sectors D2, the second write sequence number "2" and the logical addresses AD2~AD5 into the pages of the first current block CB0. More specifically, the controller 160 writes one of the second data sectors D2, the second write sequence number "2" and the logical address AD2 into page P0 of the first current block CB0; writes another one of the second data sectors D2, the second write sequence number "2" and the logical address AD3 into page P1 of the first current block CB0; writes the another one of the second data sectors D2, the second write sequence number "2" and the logical address AD4 into page P2 of the first current block CB0, and so on. Lastly, the controller 160 records the mapping relationships of the logical addresses AD2~AD5 and the physical addresses of the pages P0~P3 of the first current block CB0 in the physical-logical mapping table.

It should be noted that, in some embodiments, the data sectors of the same write command may belong to different type (random type and sequential type). In this embodiment, the controller 160 writes the data sectors into the first current block CB0 and the second current block CB1 base on the type of the data sectors. For example, as shown in FIG. 3, the controller 160 receives a third write command arranged to write a plurality of third data sectors D3 in step S400. The third write command is received subsequent to the second write command, so the controller 160 assigns "3" to the third write command to serve as the write sequence number of the third write command in step S402. It should be noted that the third write command includes the logical addresses AD6~AD10 of the third data sectors D3. Next, the quantity of third data sectors D3 indicated to be written by the third write command is greater than the quantity of a page, so the controller 160 determines that the data sectors D3 belong to the sequential type. However, the first and the last of the third data sectors D3 are less than a page, so the first and the last of the third data sectors D3 belong to the random type, and the other third data sectors D3 belong to the sequential type. For example, the quantity of each of the pages P0~P15 is 16K, wherein the address of the first page is 0~15K, the address of the second page is 16~32K, and so on. When the logical address AD6 of the start address of the third data sector D3 is 8K, the first of the third data sectors D3 is arranged to be stored in the address of 8~15K, so the first of the third data sectors D3 is less than the quantity of a page, and the first one corresponding to the logical address AD6 of the third data sectors D3 is random type. Next, the controller 160 respectively writes the first and the last of the third data sectors D3 belonging to the random type, the third write sequence number "3" and the logical addresses AD6 and AD10 into page P1 and page P2 of the second current block CB1, and writes the other parts of the third data sectors D3 that belong to the sequential type, the third write sequence number "3" and the logical addresses AD7~AD9 into pages P4~P6 of the first current block CB0. More specifically, the controller 160 writes the first of the third data sectors D3, the third write sequence number "3" and the logical address AD6 into page P1 of the second current block CB1; writes the second of the third data sectors D3, the third write sequence number "3" and the logical address AD7 into page P4 of the first current block CB0; writes the third of the third data sectors D3, the third write sequence number "3" and the logical address AD8 into page P5 of the first current block CB0, and so on. Lastly, the controller 160 records the mapping relationships of the logical addresses AD6~AD9 and the physical addresses of the pages of the first current block CB0 and the second current block CB1 in the physical-logical mapping table.

Next, in step S410, the controller 160 determines whether the first current block CB0 and the second current block CB1 have available memory space to be written. When the first current block CB0 and the second current block CB1 have available memory space to be written, the process returns to step S400 to continue determining whether another write command is received, otherwise the process goes to step S412.

In step S412, the controller 160 organizes the physical-logical mapping table into the data mapping table TB1, defines the first current block CB0 and the second current block CB1 as the mother blocks (data blocks), selects two available blocks from the blocks B0~BN of the flash memory 180 as a new first current block CB0 and a new second current block CB1, and builds a new physical-logical mapping table in the random access memory 166 to record the mapping relationships of the physical address and the logical address of the pages in the new first current block CB0 and the new second current block CB1. Next, the process returns to step S400, the controller 160 continues to determine whether another write command is received.

Figure 5:
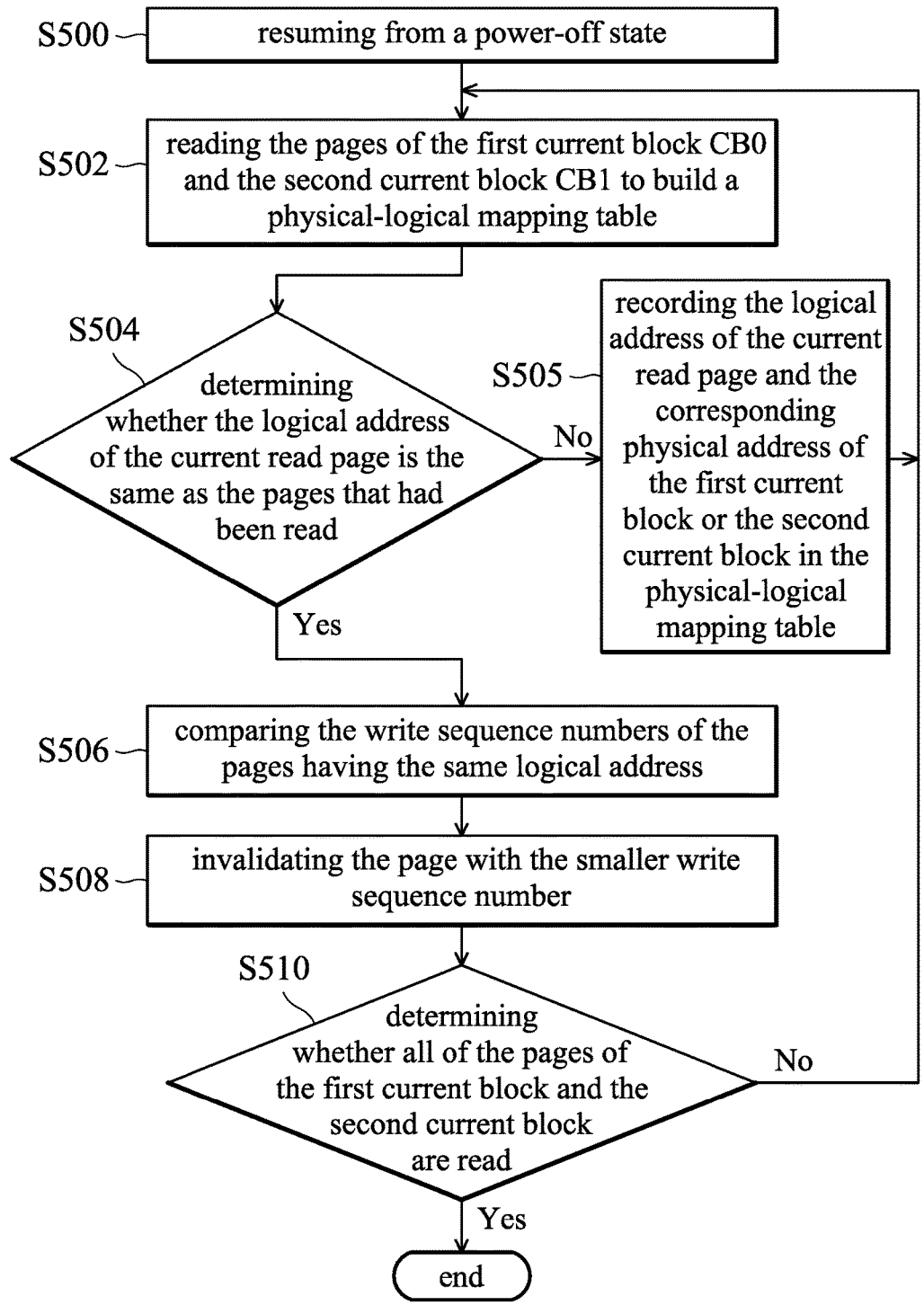
FIG. 5 is a flowchart of a data maintenance method in accordance with other embodiments.

FIG. 5 is a flowchart of a data maintenance method in accordance with other embodiments. The data maintenance method is applied to the data storage device 140 of FIG. 1, and the data maintenance method of FIG. 5 is arranged to build the physical-logical mapping table after a power-off state. The process starts at step S500.

In step S500, the data storage device 140 is resumed from a power-off state. It should be noted that the power-off state can be caused by turning the device off normally, or by being abnormally powered down.

Next, in step S502, the controller 160 reads the pages of the first current block CB0 and the second current block CB1 to build a physical-logical mapping table. In one of the embodiments, the controller 160 starts to read the pages from the first page of the first current block CB0, but it is not limited thereto. In the other embodiments, the controller 160 starts to read the pages from the last page of the first current block CB0. In other embodiments, the controller 160 can also start to read the pages from the last page or the first page of the second current block CB1.

In step S504, the controller 160 determines whether the logical address of the current read page is the same as the pages that had been read. When the controller 160 determines that the logical address of the current read page is the same as the logical address of a page that had been read before, the process goes to step S506, otherwise, the process goes to step S505.

In step S505, the controller 160 records the logical address of the current read page and the corresponding physical address of the first current block CB0 or the second current block CB1 in the physical-logical mapping table. Next, the process returns to step S502, the controller 160 continues to read the next page of the first current block CB0 or the second current block CB1.

In step S506, the controller 160 compares the write sequence numbers of the pages having the same logical address. Namely, the controller 160 compares the write sequence number stored in the spare area of the current read page with the write sequence number stored in the spare area of the page having the same logical address as the current read page.

Next, in step S508, the controller 160 invalidates the page with the smaller write sequence number. For example, when the write sequence number of the current read page is greater than the write sequence number of the page that has the same write sequence number with the current read page, the controller 160 replace the data of the page that has the same write sequence number with the current read page in the physical-logical mapping table by the logical address of the current read page and the corresponding physical page of the first current block CB0 or the second current block CB1. When the write sequence number of the current read page is smaller than the page that has the same write sequence number with the current read page, the controller 160 does not record the logical address of the current read page and the corresponding physical page of the first current block CB0 or the second current block CB1 in the physical-logical mapping table.

Next, in step S510, the controller 160 determines whether all of the pages of the first current block CB0 and the second current block CB1 are read. When any of the pages of the first current block CB0 and the second current block CB1 has not been read, the process goes to step S502, the controller 160 continues to read the next page. When all of the pages of the first current block CB0 and the second current block CB1 are read, the process ends at step S510. It should be noted that, in other embodiments, the controller 160 can also determine whether the logical address is repeated after all of the pages of the first current block CB0 and the second current block CB1 are read, but it is not limited thereto.

Figure 6A:
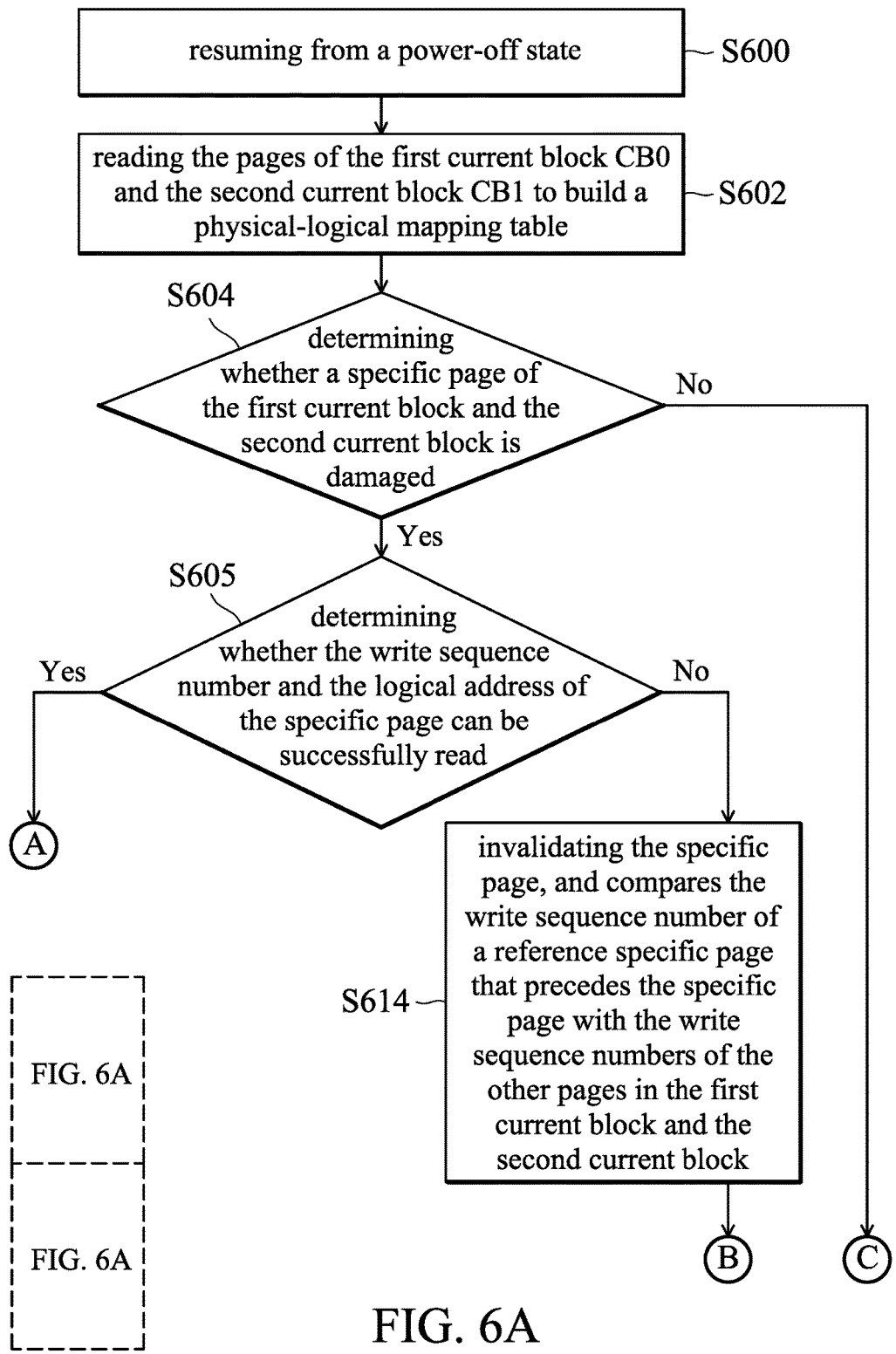
FIG. 6A-6B are flowcharts of a data maintenance method in accordance with another embodiments.
Figure 6B:
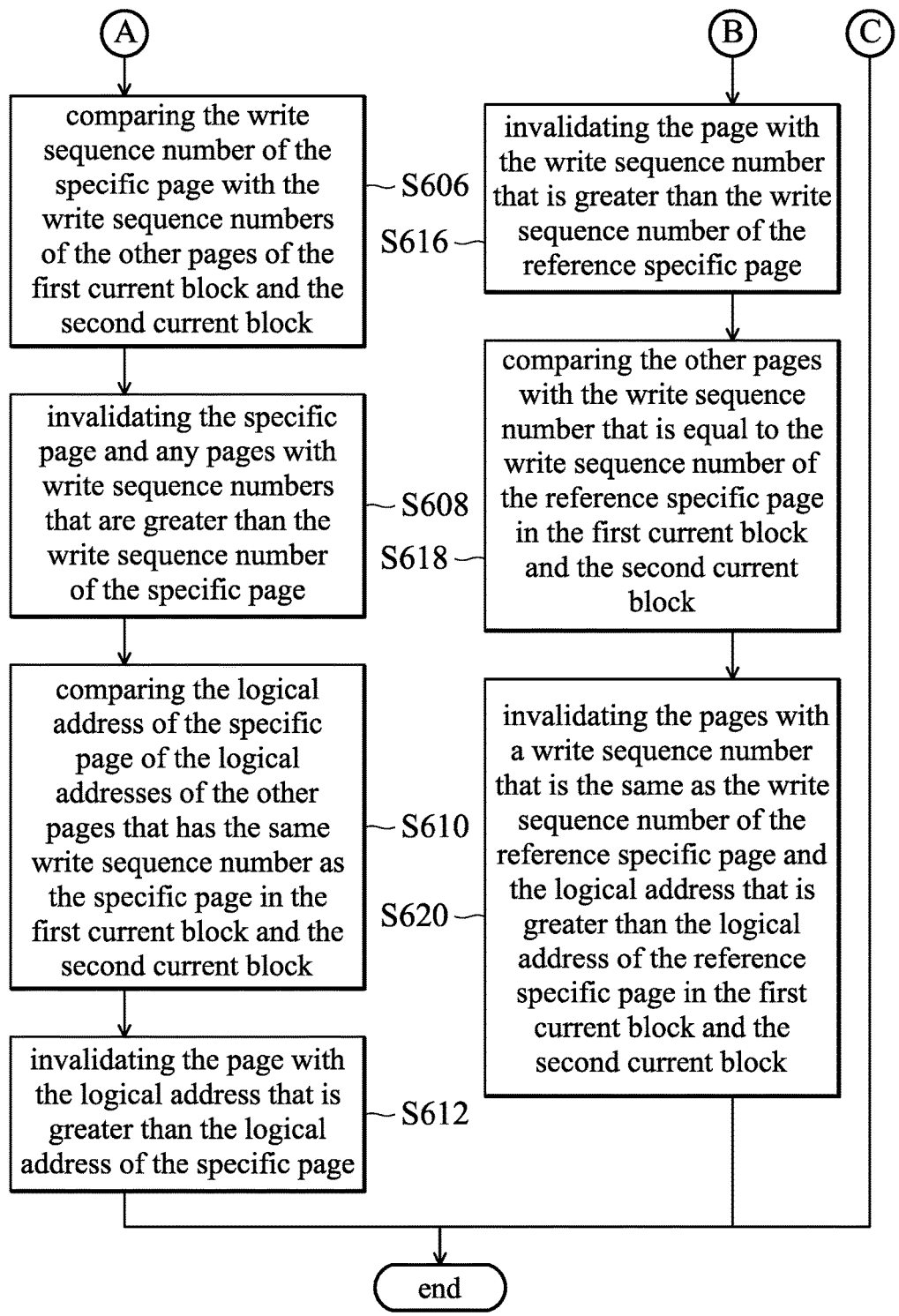

FIG. 6A~6B is a flowchart of a data maintenance method in accordance with another embodiments. The data maintenance method is applied to the data storage device 140 of FIG. 6, and the data maintenance method of FIG. 6 is arranged to build the physical-logical mapping table after a power-off state. The process starts at step S600.

In step S600, the data storage device 140 is resumed from a power-off state. It should be noted that the power-off state can be caused by turning the device off normally, or by being abnormally powered down.

Next, in step S602, the controller 160 reads the pages of the first current block CB0 and the second current block CB1 to build a physical-logical mapping table. In one of the embodiments, the controller 160 starts to read the pages from the first page of the first current block CB0, but it is not limited thereto. In the other embodiments, the controller 160 starts to read the pages from the last page of the first current block CB0. In other embodiments, the controller 160 can also start to read the pages from the last page or the first page of the second current block CB1.

Next, in step S604, the controller 160 determines whether a specific page of the first current block CB0 and the second current block CB1 is damaged. It should be noted that the specific page can be any page of the first current block CB0 and the second current block CB1. When a specific page is damaged, the process goes to step S605, otherwise the process ends at step S604.

In step S605, the controller 160 determines whether the write sequence number and the logical address of the specific page can be successfully read. When the write sequence number and the logical address of the specific page can be successfully read, the process goes to step S606, otherwise the process goes to step S614.

In step S606, the controller 160 compares the write sequence number of the specific page with the write sequence numbers of the other pages of the first current block CB0 and the second current block CB1.

Next, in step S608, the controller 160 invalidates the specific page and any pages with write sequence numbers that are greater than the write sequence number of the specific page. Namely, the controller 160 deletes the mapping relationships of the specific page and any pages with write sequence numbers that are greater than the write sequence number of the specific page in the physical-logical mapping table. For example, as shown in FIG. 3, when the data sector D3 of page P5 in the first current block CB0 is damaged due to the power-off state, the controller 160 invalidates the data sector D3 stored in page P5 and reads the write sequence number of page P5 of the first current block CB0. Next, the controller 160 compares the write sequence number "3" stored in page P5 of the first current block CB0 with the write sequence numbers stored in the other pages of the first current block CB0 and the second current block CB1. The write sequence number of page P4 of the second current block CB1 is "4", so the controller 160 invalidates page P4 of the second current block CB1 with the write sequence number larger than the write sequence number "3" of page P5.

Next, in step S610, the controller 160 compares the logical address of the specific page of the logical addresses of the other pages that has the same write sequence number as the specific page in the first current block CB0 and the second current block CB1.

Next, in step S612, the controller 160 invalidates the page with the logical address that is greater than the logical address of the specific page. Namely, the controller 160 deletes the mapping relationship stored in the physical-logical mapping table of the page with the logical address that is greater than the logical address of the specific page. For example, as shown in FIG. 3, when the data sector D3 stored in page P5 of the first current block CB0 is damaged due to the power-off state, the controller 160 detects that the write sequence numbers stored in page P4 and page P6 of the first current block CB0 and the pages P1~P2 of the second current block CB1 are equal to the write sequence number stored in page P5 of the first current block CB0. The controller 160 reads the logical address "AD8" of page P5 of the first current block CB0, and compares the logical address "AD8" of page P5 of the first current block CB0 with the logical addresses of the pages P1~P2 of the second current block CB1 and page P4 and page P6 of the first current block page CB0. The logical address of page P4 of the first current block CB0 is AD7, the write sequence number of page P6 of the first current block CB0 is AD9, and the write sequence number of page P2 of the second current block CB1 is AD10, and so the controller 160 invalidates page P6 of the first current block CB0 having the logical address that is greater than the logical address "AD8" of page P5 and page P2 of the second current block CB1 having the logical address that is greater than the logical address "AD8" of page P5. The process ends at step S612.

In step S614, the controller 160 invalidates the specific page, and compares the write sequence number of a reference specific page that precedes the specific page with the write sequence numbers of the other pages in the first current block CB0 and the second current block B1. Namely, the controller 160 deletes the mapping relationship stored in the physical-logical mapping table of the specific page. For example, as shown in FIG. 3, when the write sequence number and the logical address of the damaged page P5 in the first current block CB0 cannot be successfully read, the controller 160 invalidates the damaged page P5 and serves page P4 of the first current block CB0 with the physical address that precedes the physical address of page P5 of the first current block CB0 as a reference specific page. The controller 160 reads the write sequence number of page P4 in the first current block CB0. Next, the controller 160 compares the write sequence number "3" of page P4 of the first current block CB0 with the write sequence numbers of the other pages in the first current block CB0 and the second current block CB1.

Next, in step S616, the controller 160 invalidates the page with the write sequence number that is greater than the write sequence number of the reference specific page. Namely, the controller 160 deletes the mapping relationship of page with the write sequence number that is greater than the write sequence number of the reference specific page in the physical-logical mapping table. For example, as shown in FIG. 3, when page P4 of the first current block CB0 is the reference specific page, the write sequence number of page P4 of the second current block CB1 is 4, so the controller 160 invalidates page P4 of the second current block CB1 that has the write sequence number greater than the write sequence number "3" of page P5.

Next, in step S618, the controller 160 compares the other pages with the write sequence number that is equal to the write sequence number of the reference specific page in the first current block CB0 and the second current block CB1.

Next, in step S620, the controller 160 invalidates the pages with a write sequence number that is the same as the write sequence number of the reference specific page and the logical address that is greater than the logical address of the reference specific page in the first current block CB0 and the second current block CB1. For example, as shown in FIG. 3, when page P4 of the first current block CB0 is the reference specific page, the controller 160 detects that the write sequence numbers of page P6 of the first current block CB0 and the pages P1~P2 of the second current block CB1 are equal to the write sequence number of page P4 of the first current block CB0. The controller 160 reads the logical address "AD7" of page P4 of the first current block CB0, and compares the logical address of page P6 of the first current block CB0 with the logical addresses of the pages P1~P2 of the second current block page CB1 in step S618. The write sequence number of page P6 of the first current block CB0 is AD9, and the write sequence number of page P2 of the second current block CB1 is AD10, so the controller 160 invalidates page P2 of the second current block CB1 that has the logical address greater than the logical address "AD7" of page P4 and invalidates page P6 of the first current block CB0 that has the logical address greater than the logical address "AD7" of page P4.

Figure 7A:
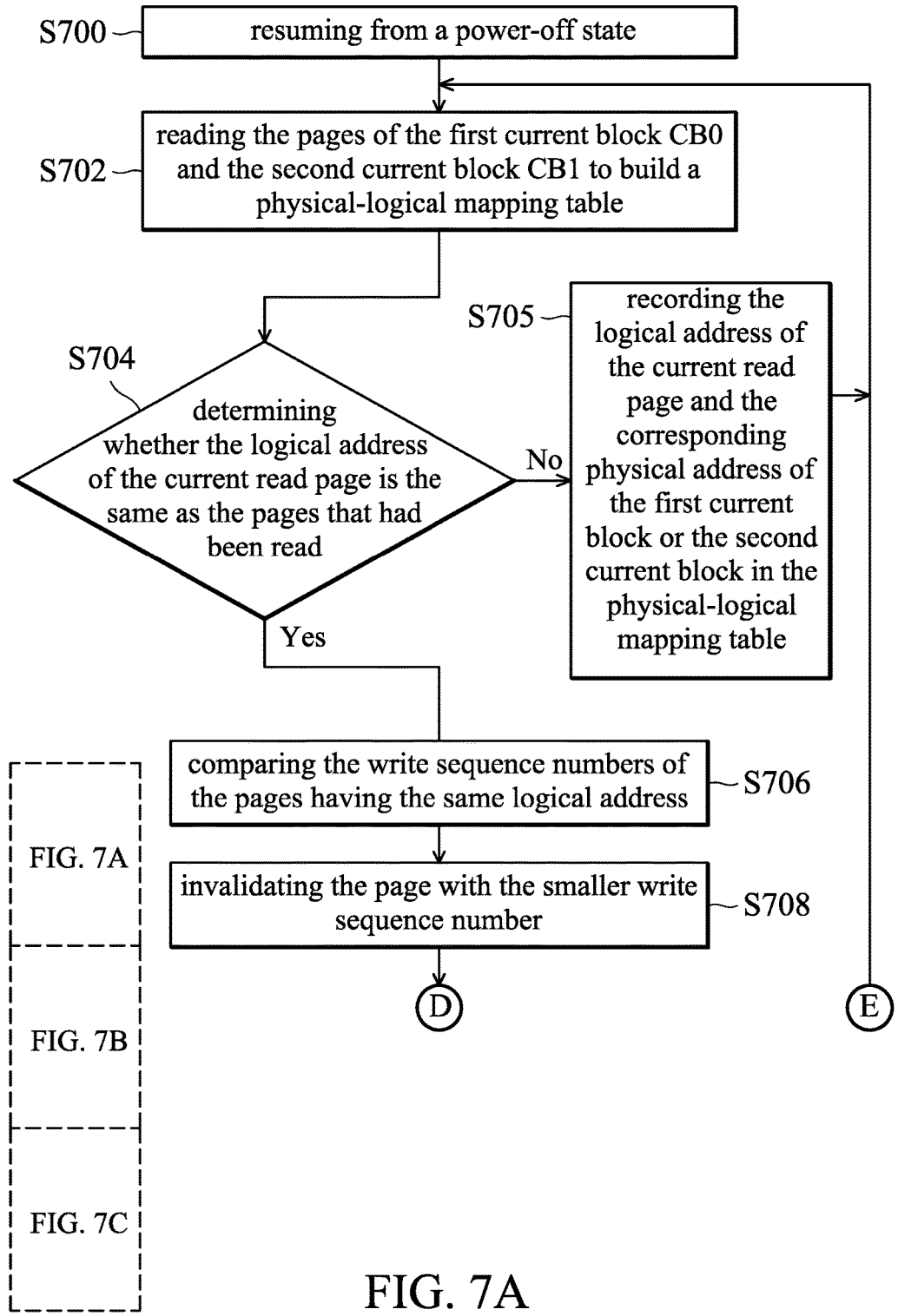
FIG. 7A-7C are flowcharts of a data maintenance method in accordance with another embodiments.
Figure 7B:
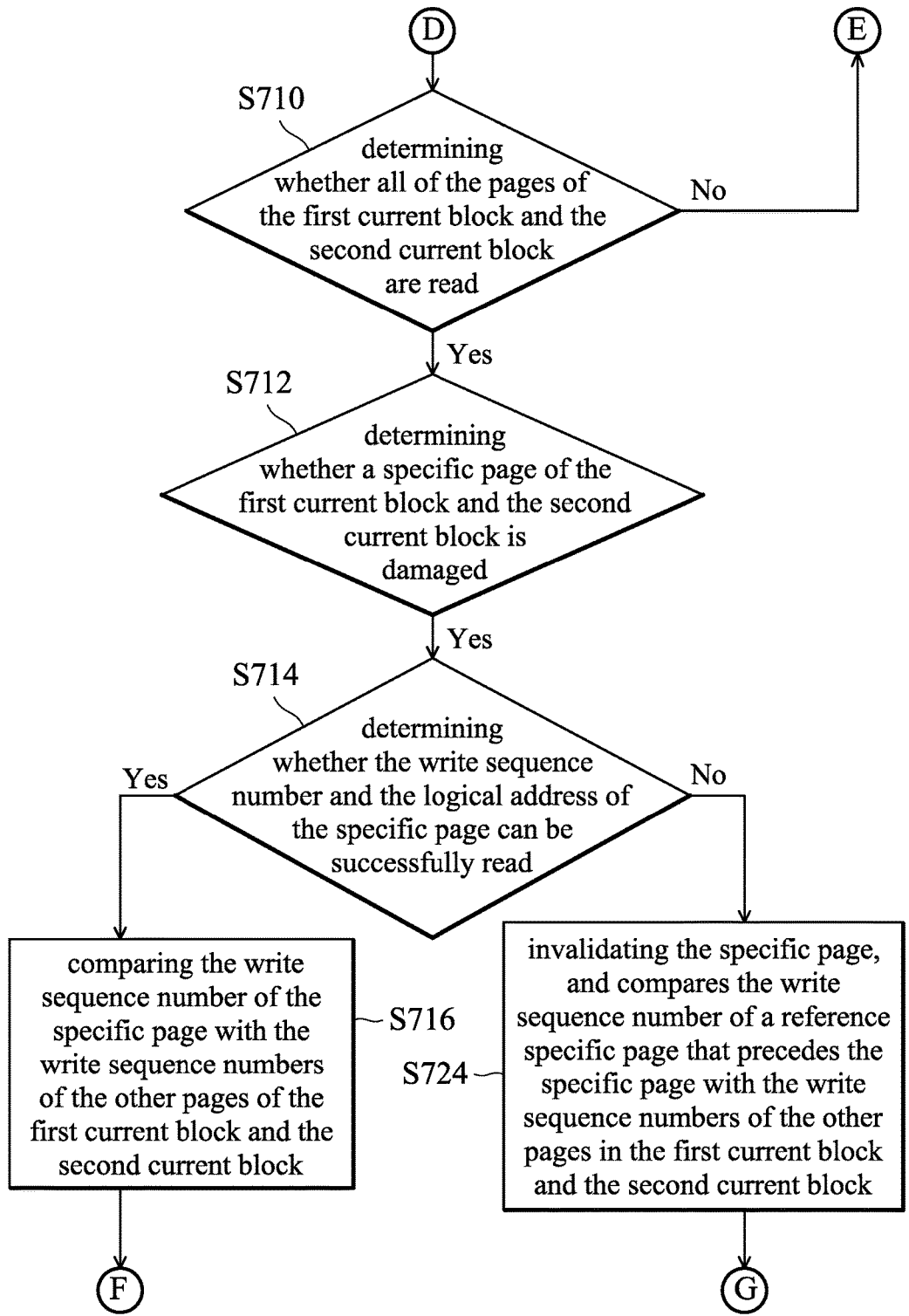
Figure 7C:
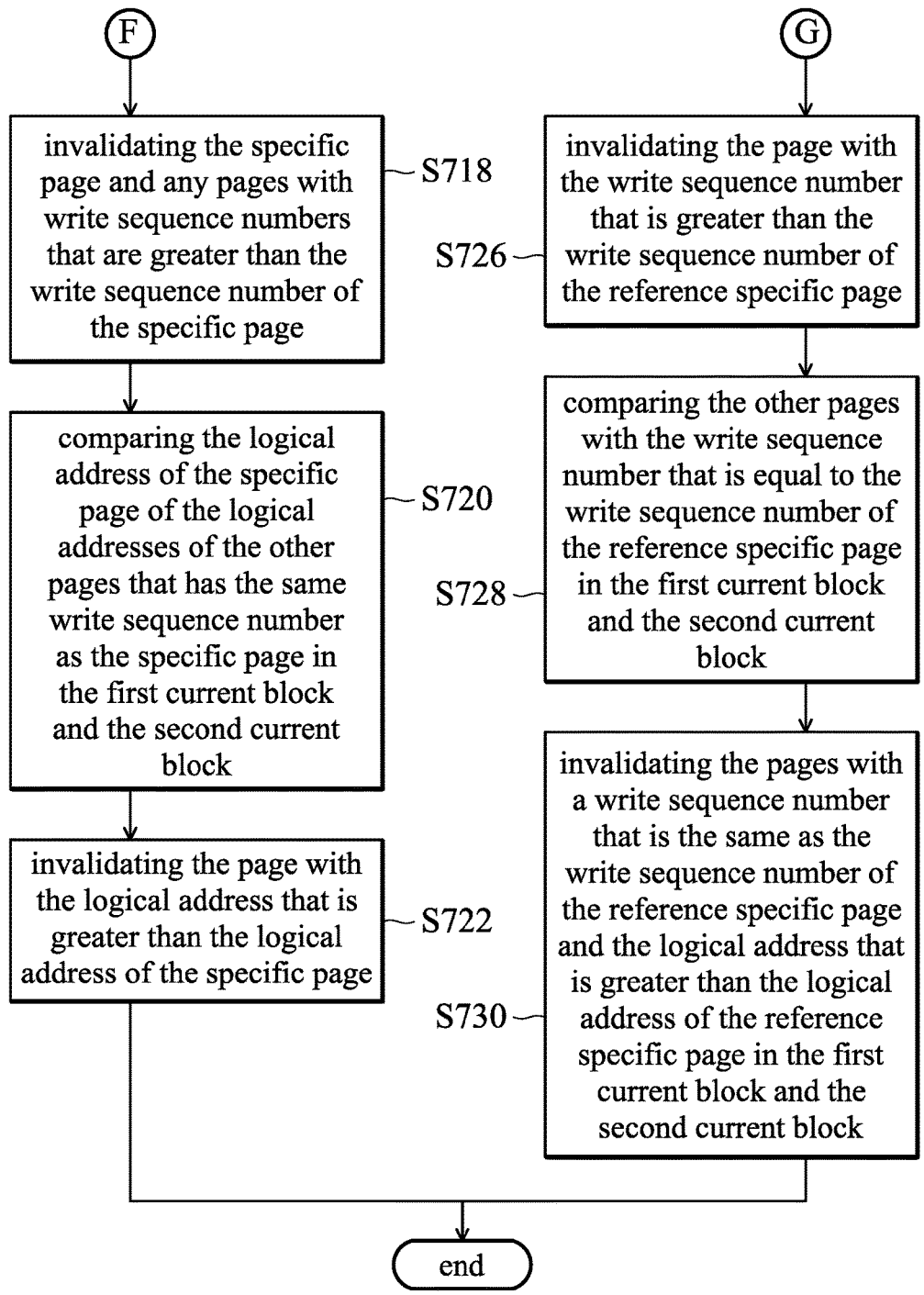

FIG. 7A~7C is a flowchart of a data maintenance method in accordance with another embodiments. The data maintenance method of FIG. 7 includes the data maintenance methods of FIG. 5 and FIG. 6, wherein the details of steps S700~S710 of FIG. 7 can be found by referring to the descriptions of steps S500~S510 of FIG. 5, and the details of steps S712~S730 of FIG. 7 can be found by referring to the descriptions of steps S604~S620 of FIG. 6.

The data storage device 140 and the data maintenance method can record the sequence of the write commands in the pages so that the data storage device 140 and the data maintenance method can rebuild the physical-logical mapping table according to the sequence of the write commands.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device capable of rebuilding physical-logical mapping relationships of a flash memory after the data storage is resumed from a power-off state, the data storage device comprising:

a flash memory, comprising a plurality of physical blocks, each of the physical blocks has a plurality of physical pages; and a controller, receiving a plurality of write commands in a sequence, assigning a plurality of write sequence numbers to the write commands according to the sequence in which the write commands are received, and writing a plurality of logical data sectors and the write sequence numbers of the write commands into the physical pages of a first current block and a second current block of the physical blocks in the flash memory according to the write commands, wherein the write commands further comprise a plurality of logical addresses of the logical data sectors, the controller further writes the logical addresses corresponding to the logical data sectors into the physical pages of the first current block and the second current block, in response to a specific write command in the write commands being a sequential write command, the controller determines a data type of the logical data sectors, that are page-aligned and equal to one of the physical pages in size, indicated by the specific write command belonging to a sequential type, and determines the data type the logical data sectors, that are smaller than one of the physical pages in size, indicated by the specific write command belonging to a random type, in response to the specific write command in the write commands being a random write command, the controller determines the data type o the logical data sector indicated by the specific write command belonging to the random type, wherein the controller writes the logical data sector belonging to the sequential type into the physical pages of the first current block, and writes the logical data sector belonging to the random type into the physical pages of the second current block, wherein when the controller receives a first write command of the write commands that is arranged to write a plurality of first logical data sectors of the logical data sectors, the controller assigns a first write sequence number of the write sequence numbers to the first write command according to the sequence in which the first write command is received, and sequentially writes the first logical data sectors, the first write sequence number and the logical addresses of the first logical data sectors into a plurality of first physical pages of the first current block and the second current block according to the first write command and the data type of the first logical data sectors, wherein each of the first physical pages comprises one of the first logical data sectors, one of the first write sequence numbers and one of the logical addresses, wherein the controller sequentially reads the write sequence number and logical the address recorded in each physical page of the first current block and the second current block, determines valid physical pages in the first current block and the second current block that are not invalidated using the write sequence number and logical the address recorded in each physical page of the first current block and the second current block, and builds a physical-logical mapping table by recording a mapping relationship between a physical address and the written logical address of each valid physical page in the first current block and second current block after the data storage device is resumed from a power-off state, wherein when the controller detects that a specific physical page is damaged during the process of reading the first current block or the second current block, the controller invalidates the specific page, reads the write sequence number and the logical address of the specific physical page, invalidates the physical page with the write sequence number that is greater than the write sequence number of the specific physical page, and invalidates the physical page with the write sequence number, which is equal to the write sequence number of the specific physical page, and the logical address, which is larger than the logical address of the specific page, wherein when the write sequence number and the logical address of the specific physical page cannot be successfully read, the controller invalidates the specific physical page and reads the write sequence number and the logical address of a reference specific physical page that precedes the specific physical page for invalidating the physical page with the write sequence number that is greater than the write sequence number of the reference specific physical page and invalidating the physical page with the write sequence number, which is equal to the write sequence number of the specific physical page, and the logical address, which is greater than the logical address of the reference specific physical page.

2. The data storage device as claimed in claim 1, wherein when the controller detects that any of the logical addresses is in both the first current block and the second current block during the process of reading the first current block and the second current block, the controller compares the write sequence numbers of the physical pages with the same logical address, and invalidates the physical page with the smaller write sequence number.

3. A data maintenance method, applied to a data storage device with a flash memory, capable of rebuilding physical-logical mapping relationships of the flash memory after the data storage is resumed from a power-off state, wherein the flash memory comprises a plurality of physical blocks, each of the physical blocks comprises a plurality of physical pages, and the data maintenance method comprises:

receiving a plurality of write commands in a sequence;

assigning a plurality of write sequence numbers to the write commands according to the sequence in which the write commands are received; and writing a plurality of logical data sectors and the write sequence numbers of the write commands into the physical pages of a first current block and a second current block of the physical blocks in the flash memory according to the write commands;

wherein the write commands further comprise a plurality of logical addresses of the logical data sectors, and the data maintenance method further comprises writing the logical addresses corresponding to the logical data sectors into the physical pages of the first current block and the second current block, wherein the step of writing the logical data sectors and the write sequence numbers of the write commands into the physical pages of the first current block and the second current block of the physical blocks in the flash memory according to the write commands further comprises:

assigning a first write sequence number of the write sequence numbers to a first write command according to the sequence in which the first write command arranged to write a plurality of first logical data sectors of the data sectors is received;

in response to the first write command being a sequential write command, determining the first logical data sectors, that are equal to one of the physical pages in size, indicated by the first write command belonging to a sequential type, and determining the first logical data sectors, that are smaller than one of the physical pages in size, indicated by the first write command belonging to a random type;

in response to the first write command in the write commands being a random write command, determining the first logical data sector indicated by the first write command belonging to the random type;

when the first logical data sectors belong to the sequential type, writing the first logical data sectors, the first write sequence number and the logical addresses of the first logical data sectors into a plurality of first physical pages of the first current block; and when the first logical data sectors belong to the sequential type, writing the first logical data sectors, the first write sequence number of the first logical data sectors and the logical addresses of the first logical data sectors into at least one second page of the first current block, wherein each of the first physical pages and the second physical page comprises one of the first logical data sectors, one of the first write sequence numbers and one of the logical addresses, wherein the method further comprises:

sequentially reading the write sequence number and logical the address recorded in each physical page of the first current block and the second current block, determining valid physical pages in the first current block and the second current block that are not invalidated using the write sequence number and logical the address recorded in each physical page of the first current block and the second current block, and building a physical-logical mapping table by recording a mapping relationship between a physical address and the written logical address of each valid physical page in the first current block and second current block after the data storage device is resumed from a power-off state;

invalidating the specific physical page and comparing the write sequence number of the specific physical page and the write sequence numbers of the other physical pages in the first current block and the second current block when a specific damaged physical page is detected in the first current block or the second current block during the steps of reading the first current block and the second current block;

invalidating at least one of the physical pages with the write sequence number that is greater than the write sequence number of the specific page;

comparing the logical address of the specific physical page with the logical address of at least one third physical page of the first current block and the second current block when the write sequence number of the specific page is equal to the write sequence number of the third physical page;

invalidating the third physical page with the logical address that is greater than the logical address of the specific page, when the write sequence number and the logical address of the specific physical page cannot be successfully read, invalidating the specific physical page and comparing the write sequence number of a reference specific physical page which precedes the specific physical page with the write sequence numbers of the other physical pages in the first current block and the second current block;

invalidating the physical page with the write sequence number that is greater than the write sequence number of the reference specific page;

when the write sequence number of the reference specific physical page is equal to the write sequence number of the first current block and at least one fourth physical page of the second current block, comparing the logical address of the reference specific physical page and the logical address of the fourth physical page; and invalidating the fourth physical page with the logical address that is greater than the logical address of the reference specific physical page.

4. The data maintenance method as claimed in claim 3, further comprising when the physical pages with the same logical address in the first current block and the second current block are detected during the process of reading the first current block and the second current block, comparing the write sequence numbers of the physical pages with the same logical address and invalidating the physical page with the smaller write sequence number.

* * * * *